United States Patent
Boul et al.

(10) Patent No.: US 11,370,706 B2
(45) Date of Patent: Jun. 28, 2022

(54) CEMENT SLURRIES, CURED CEMENT AND METHODS OF MAKING AND USE THEREOF

(71) Applicant: Saudi Arabian Oil Company, Dhahran (SA)

(72) Inventors: Peter J. Boul, Houston, TX (US); Ashok Santra, Woodlands, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/934,637

(22) Filed: Jul. 21, 2020

(65) Prior Publication Data

US 2021/0024414 A1    Jan. 28, 2021

Related U.S. Application Data

(60) Provisional application No. 62/878,815, filed on Jul. 26, 2019.

(51) Int. Cl.
| | |
|---|---|
| *C04B 20/10* | (2006.01) |
| *C04B 24/26* | (2006.01) |
| *C04B 35/628* | (2006.01) |
| *C04B 20/00* | (2006.01) |
| *C04B 103/40* | (2006.01) |
| *C04B 111/00* | (2006.01) |
| *C04B 111/94* | (2006.01) |

(52) U.S. Cl.
CPC ........ *C04B 20/1055* (2013.01); *C04B 20/008* (2013.01); *C04B 20/1014* (2013.01); *C04B 24/2664* (2013.01); *C04B 35/62884* (2013.01); *C04B 2103/408* (2013.01); *C04B 2111/00422* (2013.01); *C04B 2111/94* (2013.01); *C09K 2208/10* (2013.01)

(58) Field of Classification Search
CPC ......... C04B 7/02; C04B 14/104; C04B 14/16; C04B 14/202; C04B 14/308; C04B 14/368; C04B 18/08; C04B 18/141; C04B 18/146; C04B 20/008; C04B 20/1014; C04B 20/1033; C04B 20/1055; C04B 20/1066; C04B 20/2664; C04B 22/064; C04B 22/143; C04B 24/2647; C04B 28/04; C04B 35/62884; C04B 2103/402; C04B 2103/404; C04B 2103/406; C04B 2103/408; C04B 2111/00008; C04B 2111/00422; C04B 2111/94; C09K 8/467; C09K 2208/10; Y02W 30/91

See application file for complete search history.

(56) References Cited

U.S. PATENT DOCUMENTS

| | | |
|---|---|---|
| 4,663,230 A | 5/1987 | Tennett |
| 6,177,396 B1 | 1/2001 | Clapperton et al. |
| 6,787,505 B1 | 9/2004 | Maitland et al. |
| 6,900,580 B2 | 5/2005 | Dai et al. |
| 7,799,246 B2 | 9/2010 | Bordere et al. |
| 7,968,184 B2 | 6/2011 | Humphreys et al. |
| 8,075,799 B2 | 12/2011 | Hong et al. |
| 8,469,118 B2 | 6/2013 | Passade-Boupat et al. |
| 8,763,695 B2 | 7/2014 | van Zanten |
| 8,790,615 B2 | 7/2014 | Viswanathan |
| 9,777,132 B2 | 10/2017 | Kverel et al. |
| 9,987,608 B2 | 6/2018 | Pigos |
| 10,190,370 B1 | 1/2019 | Taha et al. |
| 2006/0078489 A1 | 4/2006 | Harutyunyan et al. |
| 2006/0177659 A1 | 8/2006 | Chen et al. |
| 2007/0140951 A1 | 6/2007 | O'Brien et al. |
| 2010/0105834 A1 | 4/2010 | Tour et al. |
| 2010/0224129 A1 | 9/2010 | Malecki et al. |
| 2010/0239489 A1 | 9/2010 | Harutyunyan et al. |
| 2010/0243236 A1 | 9/2010 | Koons |
| 2010/0300759 A1 | 12/2010 | Pasade-Boupat et al. |
| 2011/0011157 A1 | 1/2011 | Bourlon et al. |
| 2011/0060162 A1 | 3/2011 | Tatsuhara et al. |
| 2011/0089958 A1 | 4/2011 | Malecki et al. |
| 2011/0107942 A1 | 5/2011 | Eleto Da Silva et al. |
| 2011/0254553 A1 | 10/2011 | van Zanten |
| 2012/0015852 A1 | 1/2012 | Quintero et al. |

(Continued)

FOREIGN PATENT DOCUMENTS

| | | |
|---|---|---|
| CN | 104962276 B | 3/2019 |
| GB | 2520018 A | 5/2015 |

(Continued)

OTHER PUBLICATIONS

Nasibulin, A. G., Shandakov, S. D., Nasibulina, L. I., Cwirzen, A., Mudimela, P. R., Habermehl-Cwirzen, K., . . . & Kauppinen, E. I. (2009). A novel cement-based hybrid material. New Journal of Physics, 11(2), 023013. (Year: 2009).*

Chang, L. W., & Lue, J. T. (2009). Magnetic properties of multi-walled carbon nanotubes. Journal of nanoscience and nanotechnology, 9(3), 1956-1963. (Year: 2009).*

Office Action dated Jun. 30, 2021 pertaining to U.S. Appl. No. 16/832,250, filed Mar. 27, 2020, 31 pages.

International Search Report and Written Opinion dated Nov. 5, 2020 pertaining to International application No. PCT/US2020/043219 filed Jul. 23, 2020, 13 pgs.

Al-Rekabi, "Use of Carbon Nanofilaments in Producing Cementitious Composites with Improved Mechanical and Durability Performance", Thesis submitted Sep. 2017.

(Continued)

*Primary Examiner* — Anthony J Green
(74) *Attorney, Agent, or Firm* — Dinsmore & Shohl LLP

(57) ABSTRACT

Cured cements, cement slurries, and methods of making cured cement and methods of using cement slurries are provided. The method of making a cured cement comprising: synthesizing nanomaterials via chemical vapor deposition on at least one of cement particles or cement additive particles to form nanomaterial particles, adding the nanomaterial particles to a cement slurry to form a modified cement slurry, and curing the modified cement slurry to form a cured cement, in which the nanomaterials are interconnected and form a conductive web within the cured cement.

17 Claims, No Drawings

(56) References Cited

U.S. PATENT DOCUMENTS

| | | | |
|---|---|---|---|
| 2012/0018155 | A1 | 1/2012 | Patil et al. |
| 2012/0042806 | A1* | 2/2012 | Hersam .................. C04B 14/026 |
| | | | 106/814 |
| 2013/0213638 | A1 | 8/2013 | Keller et al. |
| 2013/0217603 | A1 | 8/2013 | Jamison et al. |
| 2014/0096964 | A1 | 4/2014 | Chakraborty et al. |
| 2014/0367091 | A1 | 12/2014 | Tour et al. |
| 2015/0153472 | A1 | 6/2015 | Tour et al. |
| 2015/0284619 | A1 | 10/2015 | Price Hoelscher et al. |
| 2016/0017202 | A1 | 1/2016 | Yang et al. |
| 2016/0258269 | A1 | 9/2016 | Musso et al. |
| 2017/0327729 | A1 | 11/2017 | Salla et al. |
| 2018/0306027 | A1 | 10/2018 | Sherman et al. |

FOREIGN PATENT DOCUMENTS

| | | |
|---|---|---|
| JP | 03174341 A | 7/1991 |
| RU | 2015129136 A | 1/2017 |
| WO | 03004155 A1 | 1/2003 |
| WO | 2006137942 A2 | 12/2006 |
| WO | 2007093725 A2 | 8/2007 |
| WO | 2011128615 A1 | 10/2011 |
| WO | 2012085516 A1 | 6/2012 |
| WO | 2012114068 A2 | 8/2012 |
| WO | 2013008209 A2 | 1/2013 |
| WO | 2014060686 A1 | 4/2014 |
| WO | 2015038117 A1 | 3/2015 |
| WO | 2015077524 A1 | 5/2015 |
| WO | 2017152298 A1 | 9/2017 |
| WO | WO-2018048569 A1 * | 3/2018 ............. C04B 28/02 |
| WO | 2018101545 A1 | 6/2018 |

OTHER PUBLICATIONS

Azhari et al., "Cement-based sensors with carbon fibers and carbon nanotubes for piezoresistive sensing", Cement & Concrete Composites, vol. 34, pp. 866-873, 2012.

Cervantes-Sodi et al., "Selective synthesis of double helices of carbon nanotube bundles grown on treated metallic substrates", Physics Status Solidi (b), vol. 249, No. 12, pp. 2382-2385, 2012.

Cwirzen et al., "CHH Cement Composite", Cement & Concrete Research, Jan. 2009.

D'Alessandro et al., "Self-sensing and thermal energy experimental characterization of multifunctional cement-matrix composites with carbon nano-inclusions", Behavior and Mechanics of Multifunctional Materials and Composites Proceedings vol. 9800, 2016.

D'Alessandro et al., "Static Dynamic Strain Monitoring of Reinforced Concrete Components through Embedded Carbon Nanotube Cement-Based Sensors", Hindawi, Shock and Vibration, vol. 2017, Article ID 3648403, 11 pages, Aug. 7, 2017.

Falikman et al., "Nanotechnologies in New Structural Concretes: Practice and Outlook", Concrete, Innovation and Desibn, fib Symposium, Cophenhagen, May 18-20, 2015.

Khalil et al., "Advanced nanomaterials in oil and gas industry: Design, application and challenges", Applied Energy 191, pp. 287-310, 2017.

Lamesh, et al., "Effect of the Support on Structure of the Multi-Walled Carbon Nanotubes Grown by CCVD over Nickel Nanoparticles", Journal of Advances in Nanomaterials, vol. 2, No. 3, Sep. 2017.

Mangadlao et al., "Smart cements and cement additives for oil and gas operations", Journal of Petroleum Science and Engineering, vol. 129, pp. 63-76, 2015.

Ning, et al., "Improvement of Fe/MgO Catalysts by Calcination for the Growth of Single- and Double-Walled Carbon Nanotubes", J. Phys. Chem., vol. 110, No. 3, pp. 1201-1205, 2006.

Sanchez et al., "Nanotechnology in concrete—A review", Construction and Building Materials, vol. 24, pp. 2060-2071, 2010.

Tragazikis et al., "Acoustic emission investigation of the mechanical performance of carbon nanotube-modified cement-based mortars", Construction and Building Materials, vol. 122, pp. 518-524, 2016.

Ubertini et al., Natural Frequencies Identification of a Reinforced Concrete Beam using Carbon Nanobube Cement-based Sensors, Engineering Structures, vol. 60, pp. 265-275, Feb. 2014.

Zolotarev et al., "Impact Resistance of Cement and Gypsum Plaster Nanomodified by Water-Soluble Fullerenols", Industrial & Engineering Chemistry Research, vol. 52, pp. 14583-14591, 2013.

International Search Report and Written Opinion dated Jul. 1, 2020 pertaining to International application No. PCT/US2020/026103 filed Apr. 1, 2020, 18 pgs.

International Search Report and Written Opinion dated Jul. 1, 2020 pertaining to International application No. PCT/US2020/026871 filed Apr. 6, 2020, 18 pgs.

International Search Report and Written Opinion dated Jul. 10, 2020 pertaining to International application No. PCT/US2020/024917 filed Mar. 26, 2020, 13 pgs.

International Search Report and Written Opinion dated Jul. 16, 2020 pertaining to International application No. PCT/US2020/028077 filed Apr. 14, 2020, 17 pgs.

Gomez et al., "Proppant immobilization facilitated by carbon nanotube mediated microwave treatment of polymer-proppant structures" Colloids and Surfaces A: Physiochemical and Engineering Aspects, Elsevier, Amsterdam, NL, vol. 513, Oct. 27, 2016, pp. 297-305.

Orbaek, Alvin W. et al., "The development of a 'process map' for the growth of carbon nanomaterials from ferrocene by injection CVD" Journal of Materials Chemistry A, vol. 1, No. 25, Jan. 1, 2013, p. 14122.

Gomez et al. "Enhanced purification of carbon nanotubes by microwave and chlorine cleaning procedures" RSC Advances, vol. 6, No. 14, Jan. 1, 2016, p. 11895-11902.

Eftekhari et al., "High-yield synthesis of carbon nanotubes using a water-soluble catalyst support in catalytic chemical vapor deposition" Carbon, Elsevier, Oxford, GB, vol. 44, No. 7, Jun. 1, 2006, pp. 1343-1345.

U.S. Office Action dated Oct. 14, 2021 pertaining to U.S. Appl. No. 16/832,279, filed Mar. 27, 2020, 42 pages.

U.S. Notice of Allowance and Fee(s) Due dated Oct. 20, 2021 pertaining to U.S. Appl. No. 16/832,250, filed Mar. 27, 2020, 15 pages.

U.S. Notice of Allowance and Fee(s) Due dated Mar. 14, 2022 pertaining to U.S. Appl. No. 16/832,218, filed Mar. 27, 2020, 9 pages.

U.S. Office Action dated Sep. 23, 2021 pertaining to U.S. Appl. No. 16/832,218, filed Mar. 27, 2020, 24 pages.

* cited by examiner

CEMENT SLURRIES, CURED CEMENT AND METHODS OF MAKING AND USE THEREOF

CROSS-REFERENCE TO RELATED APPLICATIONS

This application claims the benefit of U.S. Provisional Application Ser. No. 62/878,815, filed Jul. 26, 2019 (SA 6244 MA).

TECHNICAL FIELD

Embodiments of the present disclosure generally relate to cement slurries and methods of making and using cement slurries and to cured cements and methods of making cured cement.

BACKGROUND

Cement slurries are used in the oil and gas industries, such as for cementing in oil and gas wells. Primary, remedial, squeeze, and plug cementing techniques can be used, for instance, to place cement sheaths in an annulus between casing and well formations, for well repairs, well stability, for well abandonment (sealing an old well to eliminate safety hazards), and many other applications. These cement slurries must be able to consistently perform over a wide range of temperatures and conditions, as cured cement in an oil and gas well may be vulnerable to cyclic stresses imposed by pressure and temperature fluctuations. Cured cement may crack and break under these stresses, reducing the integrity of the wellbore.

SUMMARY

Well integrity is conventionally monitored through the use of logs and pressure testing. Cracks or breaks in the cement may decrease the amount of product produced, may increase lost circulation, and may reduce the ability to properly shut in the wellbore, increasing the possibility of a well control event. Therefore, monitoring well integrity is critical to efficient and effective productivity. Downhole sensors have been proposed as essential means to monitor sealant structural health to estimate degradation of the sealant sheath and the likelihood of zonal isolation loss. These sensors require a tailored cement to enhance the electrical conductivity of the cement sheath in the wellbore annulus. Disposing nanomaterials within the cement further enhances the electrical conductivity of the cement.

Accordingly, there is an ongoing need for cement slurries that have increased electrical conductivity. The present embodiments address these needs by providing cured cements with nanomaterials disposed within the cured cement.

In one embodiment, a method of making a cured cement is disclosed comprising synthesizing nanomaterials via chemical vapor deposition on at least one of cement particles or cement additive particles to form nanomaterial particles, adding the nanomaterial particles to a cement slurry to form a modified cement slurry, and curing the modified cement slurry to form a cured cement, in which the nanomaterials are interconnected and form a conductive web within the cured cement.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

As used throughout this disclosure, the term "cement slurry" refers to a composition comprising cement particles that is mixed with at least water to form cement. The cement slurry may contain calcined alumina ($Al_2O_3$), silica ($SiO_2$), calcium oxide (CaO, also known as lime), iron oxide (FeO), magnesium oxide (MgO), clay, sand, gravel, and mixtures of these.

As used throughout this disclosure, "curing" refers to providing adequate moisture, temperature and time to allow the concrete to achieve the desired properties (such as hardness) for its intended use through one or more reactions between the water and the cement particles.

As used throughout this disclosure, "drying" refers to merely allowing the cement to achieve a moisture condition appropriate for its intended use, which may only involve physical state changes, as opposed to chemical reactions.

As used throughout this disclosure, the term "retarder" refers to a chemical agent used to increase the thickening time of cement slurries to enable proper placement of the cement slurry within the wellbore. The need for cement retardation increases with depth due to the greater time required to complete the cementing operation and the effect of increased temperature on the cement-setting process.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "wellbore" refers to the drilled hole or borehole, including the openhole or uncased portion of the well. Borehole may refer to the inside diameter of the wellbore wall, the rock face that bounds the drilled hole.

Embodiments of the present disclosure relate to cement slurries with enhanced electrical properties. Embodiments of the present disclosure also relate to methods of producing and using cement slurries, in some particular embodiments, for use in the oil and gas industries.

Oil and gas wells may be formed in subsurface formations. The wellbore may serve to connect natural resources, such as petrochemical products, to a ground level surface. In some embodiments, a wellbore may be formed in the subsurface formation, which may be formed by a drilling procedure. To drill a subterranean well or wellbore, a drill string including a drill bit and drill collars to weight the drill bit is inserted into a predrilled hole and rotated to cut into the rock at the bottom of the hole, producing rock cuttings. Commonly, drilling fluid may be utilized during the drilling process. To remove the rock cuttings from the bottom of the wellbore, drilling fluid is pumped down through the drill string to the drill bit. The drilling fluid cools the drill bit and lifts the rock cuttings away from the drill bit and carries the rock cuttings upwards as the drilling fluid is recirculated back to the surface.

In some instances, a casing may be inserted into the wellbore. The casing may be a pipe or other tubular structure which has a diameter less than that of the wellbore. Generally, the casing may be lowered into the wellbore such that the bottom of the casing reaches to a region near the bottom of the wellbore. In some embodiments, the casing may be cemented by inserting a cement slurry into the annulus region between the outer edge of the casing and the edge of the wellbore (the surface of the subsurface formation). The cement slurry may be inserted into the annular region by pumping the cement slurry into the interior portion of the casing, to the bottom of the casing, around the bottom of the casing, into the annular region, or a combination of some or all of these. The cement slurry may displace the drilling fluid, pushing it to the top of the well. In some embodiments, a spacer fluid may be used as a buffer between the cement slurry and the drilling fluid by displacing and removing the drilling fluid before the cement slurry is pumped into the well to prevent contact between the drilling fluid and the cement slurry. Following the insertion of an appropriate amount of cement slurry into the interior region of the casing, in some embodiments, a displacement fluid may be utilized to push the cement slurry out of the interior region of the casing and into the annular region. This displacement may cause the entirety of the spacer fluid and drilling fluid to be removed from the annular region, out the top of the wellbore. The cement slurry may then be cured or otherwise allowed to harden.

To ensure the stability and safety of a well, it is important that the cured cement maintains integrity and isolates the wellbore from the surrounding subsurface formations. If the cement cracks or degrades under cyclic stresses, wellbore integrity and isolation may be lost, resulting in undesirable fluid communication between the wellbore and surrounding subsurface formations. Not intending to be limited by theory, this fluid communication may result in drilling fluid loss from the wellbore into the surrounding subsurface formation, or in decreased wellbore pressure, possibly leading to a well control event. Therefore, wellbore integrity and isolation are critical to efficient production and use of a wellbore. Wellbore integrity may be monitored through the use of sensors distributed throughout the wellbore. However, the use of conventional electrical connections to connect these sensors to the surface, such as a continuous fiber optic cable, provides a potential fluid communication pathway between subsurface formations. Furthermore, the use of such conventional electrical connections interrupts the continuity of the cement sheath and may contribute to cracks or fractures in the cement.

The present disclosure provides methods of producing cured cements which may have, among other attributes, improved electrical properties to address these concerns. Specifically, the cured cements disclosed in this application have increased electrical conductivity, and decreased bulk resistance, as compared to conventional cured cements. The method may include synthesizing nanomaterials via chemical vapor deposition on at least one of cement particles or cement additive particles to form nanomaterial particles, adding the nanomaterial particles to a cement slurry to form a modified cement slurry, and curing the modified cement slurry to form a cured cement, in which the nanomaterials are interconnected and form a conductive web within the cured cement. The cement slurry may be in accordance with any of the embodiments previously described. The method may include curing the cement slurry by allowing for a reaction between the water and the cement particles to produce cured cement. The curing step may be in accordance with any of the embodiments previously described.

As stated previously, the method includes synthesizing nanomaterials via chemical vapor deposition on at least one of cement particles or cement additive particles to form nanomaterial particles. The nanomaterials may be synthesized via chemical vapor deposition. The nanomaterials may include at least one of nanotubes, nanofibers, or nanosheets. Furthermore, the nanomaterials may include at least one of nano-silica, C—S—H nano-foils, nano-calcium oxide, nano-magnesium oxide, nano-alumina, nano-copper oxide, nano-iron oxide, nano-zinc oxide, nano-carbon, carbon nanotubes, nano-calcium carbonate, boron nitride nanotubes, or nanozirconium oxide. The carbon nanotubes comprise at least one of single-walled nanotubes, double-walled nanotubes, multi-walled carbon nanotubes, or narrow-walled nanotubes.

The cement particles may include at least one of Portland cement particles, siliceous fly ash particles, calcareous fly ash particles, slag cement particles, silica fume particles, calcium hydroxide particles, silicates particles, belite ($Ca_2SiO_5$) particles, alite ($Ca_3SiO_4$) particles, tricalcium aluminate ($Ca_3Al_2O_6$) particles, tetracalcium aluminoferrite ($Ca_4Al_2Fe_2O_{10}$) particles, brownmillerite ($4CaO.Al_2O_3.Fe_2O_3$) particles, gypsum ($CaSO_4.2H_2O$) particles, sodium oxide particles, potassium oxide particles, limestone particles, lime (calcium oxide) particles, hexavalent chromium particles, calcium aluminate particles, and combinations thereof.

The cement particles may be any suitable material which, when mixed with water, can be cured into a cement. The cement particles may be hydraulic or non-hydraulic cement particles. Hydraulic cement particles refer to a mixture of limestone, clay and gypsum burned together under extreme temperatures that may begin to harden instantly or within a few minutes while in contact with water. Non-hydraulic cement particles refer to a mixture of lime, gypsum, plasters and oxychloride. Non-hydraulic cement particles may take longer to harden or may require drying conditions for proper strengthening, but often is more economically feasible. Hydraulic or non-hydraulic cement particles may be chosen based on the desired application of the cement slurry of the present disclosure. In some embodiments, the cement particles may be Portland cement particles, for example, Class G Portland cement. Portland cement particles are hydraulic cement particles (cement particles that not only harden by reacting with water but also form a water-resistant product) produced by pulverizing clinkers, which contain hydraulic calcium silicates and one or more of the forms of calcium sulfate as an inter-ground addition.

The cement particles may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO.Al_2O_3.Fe_2O_3$), gypsum ($CaSO_4.2H_2O$), sodium oxide, potassium oxide, limestone, lime (calcium oxide), hexavalent chromium, trivalent chromium, calcium aluminate, silica sand, silica flour, hematite, manganese tetroxide, other similar compounds, and combinations of these. The cement particles may include Portland cement, siliceous fly ash, calcareous fly ash, slag cement, silica fume, quartz, any known cement particles or combinations of any of these. Silica flour is a finely ground crystalline silica with a molecular formula of $SiO_2$ and with a grain size ranging from 1 to 500 microns, from 10 to 500 microns, from 10 to 100 microns, from 10 to 80 microns, from 10 to 50 microns, from 10 to 20 microns, from 20 to 100 microns, from 20 to 80 microns, from 20 to 50 microns, from 50 to 100 microns, from 50 to 80 microns, or from 80 to 100 microns.

The cement additive particles may include at least one of barite particles, hematite particles, hausmannite particles, bentonite particles, iron oxide particles, forsterite particles, diopside particles, montmorillonite particles, vermiculite particles, sand particles, metakale particles, fly ash particles, volcanic ash particles, or pumice particles.

Synthesizing nanomaterials on the at least one of cement particles or cement additive particles to form nanomaterial particles may include heating the cement particles or cement additive particles to from 300° C. to 1400° C., from 300° C. to 1100° C., from 300° C. to 900° C., from 300° C. to 800° C., from 300° C. to 700° C., from 300° C. to 600° C., from 600° C. to 700° C., from 600° C. to 800° C., from 600° C. to 900° C., from 600° C. to 1100° C., from 600° C. to 1400° C., from 700° C. to 800° C., from 700° C. to 900° C., from 700° C. to 1100° C., from 700° C. to 1400° C., from 800° C. to 900° C., from 800° C. to 1100° C., from 800° C. to 1400° C., from 900° C. to 1100° C., from 900° C. to 1400° C., or from 1100° C. to 1400° C. In some embodiments, this may include placing the cement particles or cement additive particles into an oven or a reactor. In some embodiments, in which the nanomaterials include carbon nanotubes, synthesizing the carbon nanotubes may include placing in the oven carbon precursors, which vaporize as the oven heats, to form the nanomaterial particles. In other embodiments, synthesizing the nanomaterials may include flowing a gas mixture over the cement particles or cement additive particles to form the nanomaterial particles. In some embodiments, the gas mixture may include argon, hydrogen, ethylene, propylene, toluene, xylene, any other gas containing carbon, and combinations thereof. Specifically, in one embodiment, the gas mixture may include argon, hydrogen, and ethylene.

In some embodiments, heating the cement particles or cement additive particles includes flowing a gas mixture over the cement particles or cement additive particles with a heating rate of from 1° C. per minute (° C./min.) to 20° C./min., from 3° C./min. to 10° C./min., from 5° C./min. to 10° C./min., from 5° C./min. to 7° C./min., or of 5° C./min. until the cement particles or cement additive particles are heated to ranges disclosed previously, and adding from 0 to 50 volume percent (vol. %), from 2 to 30 vol. %, from 2 to 20 vol. %, from 2 to 15 vol. %, from 2 to 10 vol. %, from 2 to 5 vol. %, from 5 to 30 vol. %, from 5 to 20 vol. %, from 5 to 15 vol. %, from 5 to 10 vol. %, from 10 to 30 vol. %, from 10 to 20 vol. %, from 10 to 15 vol. %, from 15 to 30 vol. %, from 15 to 20 vol. %, or from 20 to 30 vol. % carbon-based gas, as calculated by a volume of the gas mixture, to the gas mixture, and flowing the gas mixture over the cement particles or cement additive particles to form the nanomaterial particles. The carbon-based gas may include any gas that includes carbon, such as, as nonlimiting examples, carbon dioxide or hydrocarbon gases. In some embodiments, the carbon-based gas may be ethylene. The gas mixture including argon, hydrogen, and ethylene may include from 20 to 50 vol. %, from 20 to 40 vol. %, from 20 to 35 vol. %, from 20 to 30 vol. %, from 30 to 50 vol. %, from 30 to 40 vol. %, from 30 to 35 vol. %, from 35 to 40 vol. %, from 35 to 50 vol. %, or from 40 to 50 vol. % hydrogen, as calculated by a volume of the gas mixture, and from 50 to 80 vol. %, from 50 to 70 vol. %, from 50 to 65 vol. %, from 50 to 60 vol. %, from 60 to 65 vol. %, from 60 to 70 vol. %, from 60 to 80 vol. %, from 65 to 80 vol. %, from 65 to 70 vol. %, or from 70 to 80 vol. % argon, as calculated by a volume of the gas mixture. Flowing the gas mixture may include flowing the gas mixture at a rate of from 400 to 1000 milliliter per minute (ml/min.), from 500 to 800 ml/min., from 600 to 800 ml/min., or at 700 ml/min.

The method includes adding the nanomaterial particles to a cement slurry to form a modified cement slurry. Water may be added to cement particles to produce the cement slurry. In embodiments in which the nanomaterials are synthesized on the cement particles, adding water to the nanomaterial particles may produce the modified cement slurry. The water may be distilled water, deionized water, or tap water. In some embodiments, the water may contain additives or contaminants. For instance, the water may include freshwater, seawater, produced water, formation water, natural or synthetic brine, or salt water. In some embodiments, salt or other organic compounds may be incorporated into the water to control certain properties of the water, and thus the cement slurry, such as density. Without being bound by any particular theory, increasing the saturation of water by increasing the salt concentration or the level of other organic compounds in the water may increase the density of the water, and thus, the cement slurry. Suitable salts may include, but are not limited to, alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these.

In some embodiments, the cement slurry may contain from 10 wt. % to 70 wt. % by weight of cement particles (BWOC) water. In some embodiments, the cement slurry may contain from 10 wt. % to 40 wt. %, from 10 wt. % to 30 wt. %, from 10 wt. % to 20 wt. %, from 20 wt. % to 40 wt. %, from 25 wt. % to 35 wt. %, or from 20 wt. % to 30 wt. % BWOC water. The cement slurry may contain 30 wt. % BWOC water.

The method further includes curing the modified cement slurry to form a cured cement, in which the nanomaterials are interconnected and form a conductive web within the cured cement. These nanomaterials may increase the electrical conductivity of the cured cement. The nanomaterials may form a three dimensional interconnected framework nanomaterials throughout the cured cement.

In some embodiments, curing the modified cement slurry may refer to passively allowing time to pass under suitable conditions upon which the cement slurry may harden or cure through allowing one or more reactions between the water and the cement particles. Suitable conditions may be any time, temperature, pressure, humidity, and other appropriate conditions known in the cement industry to cure a cement composition. In some embodiments, suitable curing conditions may be ambient conditions. Curing may also involve actively hardening or curing the cement slurry by, for instance, introducing a curing agent to the cement slurry, providing heat or air to the cement slurry, manipulating the environmental conditions of the cement slurry to facilitate reactions between the water and the cement particles, or a combination of these. Usually, the cement will be cured and convert from liquid to solid due to subsurface formation conditions, temperature, and pressure. In the laboratory, a curing chamber capable of applying temperature and pressure is used for curing the cement specimens at required conditions. Cylindrical molds (2" diameter and 5" length) were lowered into the curing chamber. Pressures and temperatures were maintained until shortly before the end of the curing where they were reduced to ambient conditions.

In some embodiments, curing may occur at a relative humidity of greater than or equal to 80% in the cement slurry and a temperature of greater than or equal to 50° F. for a time period of from 1 to 14 days. Curing may occur at a relative humidity of from 80% to 100%, such as from 85% to 100%, or 90% to 100%, or from 95% to 100% relative humidity in the cement slurry. The cement slurry may be cured at temperatures of greater than or equal to 50° F., such as greater than or equal to 75° F., greater than or equal to 80° F., greater than or equal to 100° F., greater than or equal to 120° F., or greater than or equal to 180° F. The cement slurry may be cured at temperatures of from 50° F. to 250° F., or from 50° F. to 200° F., or from 50° F. to 150° F., or from 50° F. to 120° F., or from 50° F. to 180° F. In some instances, the temperature may be as great as 200° F., 300° F., 400° F., or 500° F. The cement slurry may be cured at pressures of greater than or equal to 20 psi, greater than or equal to 200 psi, greater than or equal to 500 psi, greater than or equal to 1000 psi, greater than or equal to 2000 psi, or greater than or equal to 3000 psi. The cement slurry may be cured at pressures of from 20 psi to 5000 psi, or from 200 psi to 5000 psi, or from 200 psi to 3000 psi, or from 500 psi to 2000 psi, or from 500 psi to 3000 psi. In some instances, the pressure may be as great as 1000 psi, 2000 psi, 3000 psi, 5000 psi, or 10000 psi. The cement slurry may be cured for from 1 day to 14 days, such as from 3 to 14 days, or from 5 to 14 days, or from 7 to 14 days, or from 1 to 4 days, or from 4 to 7 days.

As stated previously, the nanomaterials may include carbon nanotubes. These carbon nanotubes comprise at least one of single-walled nanotubes, double-walled nanotubes, multi-walled nanotubes, narrow-walled nanotubes, or bundle of nanotubes. The carbon nanotubes may comprise a diameter of from 1 to 200 nm, from 20 to 100 nm, from 10 to 80 nm, from 4 to 20 nm, from 2 to 12 nm, from 2 to 10 nm, from 2 to 9 nm, from 2 to 8 nm, from 2 to 7 nm, from 2 to 6 nm, from 2 to 5 nm, from 2 to 4 nm, from 2 to 3 nm, 3 to 12 nm, from 3 to 10 nm, from 3 to 9 nm, from 3 to 8 nm, from 3 to 7 nm, from 3 to 6 nm, from 3 to 5 nm, from 3 to 4 nm, 4 to 12 nm, from 4 to 10 nm, from 4 to 9 nm, from 4 to 8 nm, from 4 to 7 nm, from 4 to 6 nm, from 4 to 5 nm, 5 to 12 nm, from 5 to 10 nm, from 5 to 9 nm, from 5 to 8 nm, from 5 to 7 nm, from 5 to 6 nm, 6 to 12 nm, from 6 to 10 nm, from 6 to 9 nm, from 6 to 8 nm, from 6 to 7 nm, 7 to 12 nm, from 7 to 10 nm, from 7 to 9 nm, from 7 to 8 nm, 8 to 12 nm, from 8 to 10 nm, from 8 to 9 nm, 9 to 12 nm, from 9 to 10 nm, from 10 to 12 nm, or of 8 nm.

The carbon nanotubes may comprise a length of from 20 to 500 µm, 20 to 200 µm, 20 to 150 µm, 20 to 100 µm, 50 to 500 µm, from 50 to 200 µm, from 50 to 150 µm, from 50 to 100 µm, from 100 to 500 µm, from 100 to 200 µm, from 100 to 150 µm, from 150 to 500 µm, from 150 to 200 µm, or from 200 to 500 µm.

An aspect ratio is the length of a substance divided by the width, or diameter. The carbon nanotubes may comprise an aspect ratio of from 100 to 100,000, from 100 to 50,000, from 500 to 30,000, from 1,000 to 20,000, from 1,000 to 100,000, from 1,000 to 50,000, from 1,000 to 40,000, from 1,000 to 30,000, from 1,000 to 25,000, from 1,000 to 20,000, from 1,000 to 15,000, from 1,000 to 12,000, from 1,000 to 10,000, from 1,000 to 8,000, from 8,000 to 100,000, from 8,000 to 50,000, from 8,000 to 40,000, from 8,000 to 30,000, from 8,000 to 25,000, from 8,000 to 20,000, from 8,000 to 15,000, from 8,000 to 12,000, from 8,000 to 10,000, from 10,000 to 100,000, from 10,000 to 50,000, from 10,000 to 40,000, from 10,000 to 30,000, from 10,000 to 25,000, from 10,000 to 20,000, from 10,000 to 15,000, from 10,000 to 12,000, from 12,000 to 100,000, from 12,000 to 50,000, from 12,000 to 40,000, from 12,000 to 30,000, from 12,000 to 25,000, from 12,000 to 20,000, from 12,000 to 15,000, from 15,000 to 100,000, from 15,000 to 50,000, from 15,000 to 40,000, from 15,000 to 30,000, from 15,000 to 25,000, from 15,000 to 20,000, from 20,000 to 100,000, from 20,000 to 50,000, from 20,000 to 40,000, from 20,000 to 30,000, from 20,000 to 25,000, from 25,000 to 100,000, from 25,000 to 50,000, from 25,000 to 40,000, from 25,000 to 30,000, from 30,000 to 100,000, from 30,000 to 50,000, from 30,000 to 40,000, from 40,000 to 50,000, from 40,000 to 100,000, or from 50,000 to 100,000.

The carbon nanotubes may comprise a specific surface area of from 100 to 12,000 square meter per gram ($m^2/g$), from 100 to 10,000 $m^2/g$, from 100 to 8,000 $m^2/g$, from 100 to 5,000 $m^2/g$, from 100 to 2,000 $m^2/g$, from 100 to 800 $m^2/g$, from 100 to 700 $m^2/g$, from 400 to 12,000 $m^2/g$, from 400 to 10,000 $m^2/g$, from 400 to 10,000 $m^2/g$, from 400 to 8,000 $m^2/g$, from 400 to 5,000 $m^2/g$, from 400 to 2,000 $m^2/g$, from 400 to 800 $m^2/g$, from 100 to 1,500 $m^2/g$, from 120 to 1,000 $m^2/g$, from 150 to 850 $m^2/g$, or from 400 to 700 $m^2/g$, where the specific surface area is calculated through the Brunauer-Emmett-Teller (BET) theory.

The multi-walled carbon nanotubes may comprise a metal oxide percentage of 10 weight percent (wt. %) or less, 5 wt. % or less, 3 wt. % or less, 2 wt. % or less, 1.5 wt. % or less, 1 wt. % or less, or 0.5 wt. % or less; and a bulk density of from 0.001 to 1 grams per cubic centimeter ($g/cm^3$), from 0.001 to 0.12 $g/cm^3$, from 0.01 to 0.08 $g/cm^3$, from 0.02 to 0.06 $g/cm^3$, from 0.01 to 1 $g/cm^3$, from 0.01 to 0.5 $g/cm^3$, from 0.01 to 0.2 $g/cm^3$, from 0.01 to 0.1 $g/cm^3$, from 0.01 to 0.05 $g/cm^3$, from 0.01 to 0.02 $g/cm^3$, from 0.02 to 1 $g/cm^3$, from 0.02 to 0.5 $g/cm^3$, from 0.02 to 0.2 $g/cm^3$, from 0.02 to 0.1 $g/cm^3$, from 0.02 to 0.05 $g/cm^3$, from 0.05 to 1 $g/cm^3$, from 0.05 to 0.5 $g/cm^3$, from 0.05 to 0.2 $g/cm^3$, from 0.05 to 0.1 $g/cm^3$, from 0.06 to 0.08 $g/cm^3$, from 0.1 to 1 $g/cm^3$, 0.1 to 0.5 $g/cm^3$, from 0.1 to 0.2 $g/cm^3$, from 0.2 to 1 $g/cm^3$, from 0.2 to 0.5 $g/cm^3$, or from 0.5 to 1 $g/cm^3$.

The method may further include functionalizing the nanomaterials with at least one of magnetic or electric properties prior to adding the nanomaterial particles to the cement slurry. Specifically, functionalizing the nanomaterials with at least one of magnetic or electric properties may include functionalizing the nanomaterials with electrically conductive elements. These electrically conductive elements may include at least one of carbon, nickel, copper, gold, silver, or titanium.

The method may further include adding at least one of a dispersing agent or a surfactant to the cement slurry prior to adding the nanomaterial particles to the cement slurry. In other embodiments the method may further include adding at least one of a dispersing agent or a surfactant to the modified cement slurry after adding the nanomaterial particles to the cement slurry. In some embodiments, the dispersing agent comprises polycarboxylate ether, sulfonated naphthalene formaldehyde condensate, sulfonated acetone formaldehyde condensate, sulfonated polymers, polystyrene sulfonate, malamide, or combinations of these. Sulfonated polymers may include aliphatic sulfonated polymers, aromatic sulfonated polymers, heteroaromatic sulfonated polymers, and combinations of these. In some embodiments, the dispersing agent may contain one or more anionic groups. For instance, the dispersing agent may include synthetic sulfonated polymers, lignosulfonates with carboxylate groups, organic acids, hydroxylated sugars, or combinations of any of these. Without being bound by any particular theory, in some embodiments, the anionic groups on the dispersing agent may be adsorbed on the surface of the cement particles to impart a negative charge to the cement slurry. The electrostatic repulsion of the negatively charged cement particles may allow the cement slurry to be dispersed and more fluid-like, improving flowability. This may allow for one or more of: reduction of friction pressure when pumping; reduction of water content; and improvement of the performance of fluid loss additives.

The surfactant may include at least one of anionic surfactants, cationic surfactants, amphoteric surfactants, zwitterionic surfactants, nonionic surfactants, or combinations thereof. The method may further include adding one or more of any additive previously described.

In some embodiments, the method may further include adding at least one additive other than nanomaterial particles to the modified cement slurry after adding the nanomaterial particles to the cement slurry. In other embodiments, the method may further include adding at least one additive other than nanomaterial particles to the cement slurry prior to adding the nanomaterial particles to the cement slurry. The one or more additives may be any additives known to be suitable for cement slurries. As non-limiting examples, suitable additives may include accelerators, retarders, extenders, suspending agents, weighting agents, fluid loss control agents, lost circulation control agents, surfactants, antifoaming agents, and combinations of these. The suspending agents may include at least one of a copolymer of N,N-dimethylacrylamide and sodium 2-acrylamido-2-methyl propane sulfonate, and hydroxyethyl cellulose.

In some embodiments, the modified cement slurry may contain from 0.1 to 10% BWOC of the one or more additives based on the total weight of the cement slurry. For instance, the modified cement slurry may contain from 0.1 to 8% BWOC of the one or more additives, from 0.1 to 5% BWOC of the one or more additives, or from 0.1 to 3% BWOC of the one or more additives. The modified cement slurry may contain from 1 to 10% BWOC of the one or more additives, from 1 to 8% BWOC, from 1 to 5% BWOC, or from 1 to 3% BWOC of the one or more additives. In some embodiments, the modified cement slurry may contain from 3 to 5% BWOC, from 3 to 8% BWOC, from 3 to 10% BWOC, or from 5 to 10% BWOC of the one or more additives.

In some embodiments, the one or more additives may alternatively or additionally include a fluid loss additive. In some embodiments, the cement fluid loss additive may include non-ionic cellulose derivatives. In some embodiments, the cement fluid loss additive may be hydroxyethylcellulose (HEC). In other embodiments, the fluid loss additive may be a non-ionic synthetic polymer (for example, polyvinyl alcohol or polyethyleneimine). In some embodiments, the fluid loss additive may include bentonite, which may additionally viscosify the cement slurry and may, in some embodiments, cause additional retardation effects.

In some embodiments, the modified cement slurry may contain from 0.1% BWOC to 10% BWOC of one or more fluid loss additives, the one or more dispersants, or both. The modified cement slurry may contain from 0.02 to 90 lb/bbl of the fluid loss additives, the one or more dispersants, or both based on the total weight of the cement slurry. For instance, the modified cement slurry may contain from 0.1 to 90 lb/bbl, from 0.1 to 75 lb/bbl, from 0.1 to 50 lb/bbl, from 1 to 90 lb/bbl, from 1 to 50 lb/bbl, from 5 to 90 lb/bbl, or from 5 to 50 lb/bbl of the fluid loss additives, the one or more dispersants, or both.

In one embodiment, the silicates phase in the cured cement may be about 75-80 wt. % of the total material. $Ca_3O_5Si$ is the major constituent, with concentration as great as 60-65 wt. %. The quantity of $Ca_2SiO_4$ conventionally does not exceed 20 wt. %, 30 wt. % or 40 wt. %. The hydration products for $Ca_3O_5Si$ and $Ca_2SiO_4$ are calcium silicate hydrate ($Ca_2H_2O_5Si$) and calcium hydroxide (Ca (OH)$_2$), also known as Portlandite. The calcium silicate hydrate commonly called CSH gel has a variable C:S and H:S ratio depending on the temperature, calcium concentration in the aqueous phase, and the curing time. The CSH gel comprises +/−70 wt. % of fully hydrated Portland cement at ambient conditions and is considered the principal binder of hardened cement. Upon contact with water, the gypsum may partially dissolve releasing calcium and sulphate ions to react with the aluminate and hydroxyl ions produced by the C3A to form a calcium trisulphoaluminate hydrate, known as the mineral ettringite ($Ca_6Al_2(SO_4)_3(OH)_{12}.26H_2O$) that will precipitate onto the $Ca_3O_5Si$ surfaces preventing further rapid hydration (flash-set). The gypsum is gradually consumed and ettringite continues to precipitate until all the gypsum is consumed. The sulphates ion concentration will reduce and the ettringite will become unstable converting to calcium monosulphoaluminate hydrate ($Ca_4Al_2O_6(SO_4)_{14}H_2O$). The remaining unhydrated $Ca_3O_5Si$ will form calcium aluminate hydrate. Cement slurry design is based on the altering or inhibition of the hydration reactions with specific additives.

In some embodiments, the nanomaterials are randomly dispersed throughout the cured cement. Specifically, by synthesizing nanomaterials via chemical vapor deposition on at least one of cement particles or cement additive particles, the nanomaterials are disposed on the surface of at least one of the cement particles or cement additive particles that form the cured cement. Additionally, the cement particles are dispersed throughout the cured cement, as these cement particles form the crystalline matrix of the cured cement. Furthermore, any cement additive particles are dispersed throughout the cured cement to impart any additive properties. This means that the nanomaterial particles formed by synthesizing nanomaterials via chemical vapor deposition on at least one of cement particles or cement additive particles are dispersed throughout the cured cement. Furthermore, these dispersed nanomaterials are interconnected a form a conductive web within the cured cement. As the nanomaterials may have electrical conductivity, an electrical current may be sent through the cement via the conductive web formed by the nanomaterials dispersed throughout the cured cement.

In some embodiments, the nanomaterials may be dispersed into the cement through a variety of methods, including, but not limited to, sonication or the exchange of superacids with surfactant. In embodiments, the superacids may include chlorosulfuric acid, triflic acid, oleum, fluorosulfuric acid, carborane acid, fluoroantimonic acid, or combinations of these. Dispersing the carbon nanotubes via sonication may include agitating the nanomaterials in the modified cement slurry with a dispersing agent, as previously described. The dispersing agent may be any of the dispersing agents previously described.

The cured cement may have a reduced density as compared to conventional cements, due to the presence of the carbon nanotubes. The cured cement may have a density of from 5 to 20 pounds per gallon (ppg), from 5 to 17 ppg, from 5 to 15 ppg, from 5 to 13 ppg, from 5 to 10 ppg, from 7 to 20 ppg, from 7 to 17 ppg, from 7 to 15 ppg, from 7 to 13 ppg, from 7 to 10 ppg, from 10 to 20 ppg, from 10 to 17 ppg, from 10 to 15 ppg, from 10 to 13 ppg, from 13 to 20 ppg, from 13 to 17 ppg, from 13 to 15 ppg, or of 13 ppg.

An elastic modulus measures a material's resistance to being deformed elastically, or non-permanently, when a stress is applied to it. The elastic modulus of an object is defined as the slope of its stress-strain curve in the elastic deformation region. A stiffer material will have a greater elastic modulus than a material that is more deformable. The equation for an elastic modulus has the generic form:

$$\lambda = \frac{stress}{strain} \qquad \text{EQUATION 1}$$

where stress is the force causing the deformation divided by the area to which the force is applied and strain is the ratio of the change in some parameter caused by the deformation to the original value of the parameter. The cured cement of the present disclosure may have a reduced elastic modulus as compared to conventional cured cements. The cured cement may have an elastic modulus of from 0.1 to 10 Mega pounds per square inch (Mpsi), from 0.1 to 8 Mpsi, from 0.1 to 5 Mpsi, from 0.1 to 3 Mpsi, from 0.1 to 1 Mpsi, from 0.1 to 0.5 Mpsi, from 0.5 to 10 Mpsi, from 0.5 to 8 Mpsi, from 0.5 to 5 Mpsi, from 0.5 to 3 Mpsi, from 0.5 to 1 Mpsi, from 1 to 10 Mpsi, from 1 to 8 Mpsi, from 1 to 5 Mpsi, from 1 to 3 Mpsi, from 3 to 10 Mpsi, from 3 to 8 Mpsi, from 3 to 5 Mpsi, from 5 to 10 Mpsi, from 5 to 8 Mpsi, or from 8 to 10 Mpsi meaning that the cured cement may have a greater fracture tolerance than conventional cured cements.

The nanomaterials may be capable of conducting electric energy. When an external mechanical force is applied to the cured cement, the conductive web of interconnected nanomaterials may deform, and the electrical conductivity of the nanomaterials may increase. The electrical conductivity of the nanomaterials may increase by 5%, by 10%, by 25%, by 50%, by 75%, by 100%, by 125%, by 150%, by 175%, by 200%, by 250%, by 300%, by 500%, by 700%, or by 1000% compared to when the mechanical force is not applied. The cured cement may have an electrical conductivity of from 0.1 to 100 Siemens per meter (S/m), from 0.1 to 75 S/m, from 0.1 to 50 S/m, from 0.1 to 25 S/m, from 0.1 to 10 S/m, from 0.1 to 5 S/m from 0.1 to 3 S/m, from 0.1 to 1 S/m, from 0.1 to 0.5 S/m, from 0.5 to 100 S/m, from 0.5 to 75 S/m, from 0.5 to 50 S/m, from 0.5 to 25 S/m, from 0.5 to 10 S/m, from 0.5 to 5 S/m, from 0.5 to 3 S/m, from 0.5 to 1 S/m, from 1 to 100 S/m, from 1 to 75 S/m, from 1 to 50 S/m, from 1 to 25 S/m, from 1 to 10 S/m, from 1 to 5 S/m, from 1 to 3 S/m, from 3 to 100 S/m, from 3 to 75 S/m, from 3 to 50 S/m, from 3 to 25 S/m, from 3 to 10 S/m, from 3 to 5 S/m, from 5 to 100 S/m, from 5 to 75 S/m, from 5 to 50 S/m, from 5 to 25 S/m, from 5 to 10 S/m, from 10 to 100 S/m, from 10 to 75 S/m, from 10 to 50 S/m, from 10 to 25 S/m, from 25 to 100 S/m, from 25 to 75 S/m, from 25 to 50 S/m, from 50 to 100 S/m, from 50 to 75 S/m, or from 75 to 100 S/m compared to when the mechanical force is not applied.

As previously stated, the nanomaterials are interconnected and form a conductive web within the cured cement. Therefore, the cured cement may conduct electric current. In some applications, the method may include conducting an electric current from a power source to sensors embedded throughout the wellbore, and then conducting an electric current from the sensors to a computing device. This electrical current may be used to monitor the integrity of the wellbore, and determine if there are fractures in the cement. Furthermore, as stated previously, the nanomaterials may be functionalized with magnetic properties, meaning that the cured cement may be magnetic in some embodiments.

As a result of this conductive web within the cured cement, the cured cement of the present disclosure may have a reduced bulk resistance as compared to conventional cured cements. The cured cement may have a bulk resistance of from 0.01 to 10 Ohm meters ($\Omega \cdot m$), from 0.01 to 8 $\Omega \cdot m$, from 0.01 to 5 $\Omega \cdot m$, from 0.01 to 3 $\Omega \cdot m$, from 0.01 to 1 $\Omega \cdot m$, from 0.01 to 0.5 $\Omega \cdot m$, from 0.01 to 0.1 $\Omega \cdot m$, from 0.1 to 10 $\Omega \cdot m$, from 0.1 to 8 $\Omega \cdot m$, from 0.1 to 5 $\Omega \cdot m$, from 0.1 to 3 $\Omega \cdot m$, from 0.1 to 1 $\Omega \cdot m$, from 0.1 to 0.5 $\Omega \cdot m$, from 0.5 to 10 $\Omega \cdot m$, from 0.5 to 8 $\Omega \cdot m$, from 0.5 to 5 $\Omega \cdot m$, from 0.5 to 3 $\Omega \cdot m$, from 0.5 to 1 $\Omega \cdot m$, from 1 to 10 $\Omega \cdot m$, from 1 to 8 $\Omega \cdot m$, from 1 to 5 $\Omega \cdot m$, from 1 to 3 $\Omega \cdot m$, from 3 to 10 $\Omega \cdot m$, from 3 to 8 $\Omega \cdot m$, from 3 to 5 $\Omega \cdot m$, from 5 to 10 $\Omega \cdot m$, from 5 to 8 $\Omega \cdot m$, or from 8 to 10 $\Omega \cdot m$. Furthermore, when an external mechanical load is applied to the cured cement, the carbon nanotubes may deform, and the bulk resistance of the cured cement may decrease. The bulk resistance of the cured cement may decrease by from 0.1% to 200%, from 0.1% to 150%, from 0.1% to 100%, from 0.1% to 75%, from 0.1% to 50%, from 0.1% to 25%, from 0.1% to 10%, from 0.1% to 5%, from 0.1% to 1%, from 1% to 200%, from 1% to 150%, from 1% to 100%, from 1% to 75%, from 1% to 50%, from 1% to 25%, from 1% to 10%, from 1% to 5%, from 5% to 200%, from 5% to 150%, from 5% to 100%, from 5% to 75%, from 5% to 50%, from 5% to 25%, from 5% to 10%, from 10% to 200%, from 10% to 150%, from 10% to 100%, from 10% to 75%, from 10% to 50%, from 10% to 25%, from 25% to 200%, from 25% to 150%, from 25% to 100%, from 25% to 75%, from 25% to 50%, from 50% to 200%, from 50% to 150%, from 50% to 100%, from 50% to 75%, from 75% to 200%, from 75% to 150%, from 75% to 100%, from 100% to 200%, from 100% to 150%, or from 150% to 200%.

Embodiments of the disclosure also relate to modified cement slurries and methods of producing the modified cement slurries, including any embodiment of the modified cement slurry previously described.

The water, cement particles, cement additive particles, nanomaterials, and nanomaterial particles may be in accordance with any of the embodiments previously described. The modified cement slurry may include one or more additives, including but not limited to defoamers, dispersants, and fluid loss additives. The mixing step, in some embodiments, may involve shearing at least one of the water, nanomaterial particles, cement particles, and cement additive particles, and, optionally, other additives to form the cement slurry. In one embodiment, the mixing may be done in the lab using a standard API blender for 15 seconds at 4,000 revolutions per minute (rpm) and 35 seconds at 12,000 rpm. The equation of mixing energy is:

$$\frac{E}{M} = \frac{k\omega^2 t}{V} \qquad \text{EQUATION 2}$$

where
$E$ = Mixing energy (kJ)
$M$ = Mass of slurry (kg)
$k = 6.1 \times 10^{-8}$ m$^5$/s (constant found experimentally)
$\omega$ = Rotational speed (radians/s)
$t$ = Mixing time (s)
$V$ = Slurry volume (m$^3$)

Further embodiments of the present disclosure relate to methods of using the modified cement slurries previously described. In some embodiments, the method may include pumping the modified cement slurry into a location to be cemented and curing the modified cement slurry by allowing the water and the cement particles to react. The location to be cemented may, for instance, be a well, a wellbore, or an annulus.

Cementing is performed when the modified cement slurry is deployed into the well via pumps, displacing the drilling fluids still located within the well, and replacing them with cement. The modified cement slurry flows to the bottom of the wellbore through the casing, which will eventually be the pipe through which the hydrocarbons flow to the surface. From there, the modified cement slurry fills in the space between the casing and the wellbore, and hardens. This creates a seal so that outside materials cannot enter the well flow, as well as permanently positions the casing in place. In preparing a well for cementing, it is important to establish the amount of cement required for the job. This may be done by measuring the diameter of the borehole along its depth, using a caliper log. Utilizing both mechanical and sonic means, multi-finger caliper logs measure the diameter of the well at numerous locations simultaneously in order to accommodate for irregularities in the wellbore diameter and determine the volume of the openhole. Additionally, the required physical properties of the cement are essential before commencing cementing operations. The proper set cement is also determined, including the density and viscosity of the material, before actually pumping the cement into the hole.

Further embodiments of the present disclosure relate to particular methods of cementing a casing in a wellbore. The method may include pumping the modified cement slurry into an annulus between a casing and a wellbore and curing the cement slurry. The modified cement slurry may be in accordance with any of the embodiments previously described. Likewise, curing the modified cement slurry may be in accordance with any of the embodiments previously described. As stated previously, cementing is performed when the modified cement slurry is deployed into the well via pumps, displacing the drilling fluids still located within the well, and replacing them with cement. The modified cement slurry flows to the bottom of the wellbore through the casing, which will eventually be the pipe through which the hydrocarbons flow to the surface. From there it fills in the space between the casing and the actual wellbore, and hardens. This creates a seal so that outside materials cannot enter the well flow, as well as permanently positions the casing in place.

In some embodiments, the modified cement slurry may contain water and may be water-based. As such, the modified cement slurry may by hydrophilic, forming stronger bonds with water-wet surfaces. Well sections drilled with non-aqueous drilling fluids may have oil-wet surfaces, resulting in poor bonding between the well and the modified cement slurry, as oil and water naturally repel. Poor bonding may lead to poor isolation and a buildup of unwanted casing-casing or tubing-casing annular pressure. Without being bound by theory, it is desirable to make the subsurface formation or casing water wet to enhance and improve the bonding between cement and casing and cement and subsurface formation. If the wettability of the subsurface formation or casing is oil wet not water wet then the bonding will be poor and could result in small gap(s) or channel(s) between the cement and casing or the cement and subsurface formation thereby resulting in improper wellbore isolation. This improper wellbore isolation could lead to fluid or gas escaping from the well through this gas or channel due to de-bonding.

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

The presently described subject matter may include one or more aspects, which should not be regarded as limiting on the teachings of the present disclosure. A first aspect may include a method of making a cured cement comprising: synthesizing nanomaterials via chemical vapor deposition on at least one of cement particles or cement additive particles to form nanomaterial particles, adding the nanomaterial particles to a cement slurry to form a modified cement slurry, and curing the modified cement slurry to form a cured cement, in which the nanomaterials are interconnected and form a conductive web within the cured cement.

Another aspect may include the previous aspect, further comprising adding at least one of a dispersing agent or a surfactant to the cement slurry prior to adding the nanomaterial particles to the cement slurry.

Another aspect may include any of the previous aspects, in which the dispersing agent comprises polycarboxylate ether.

Another aspect may include any of the previous aspects, in which the surfactant comprises at least one of anionic surfactants, cationic surfactants, amphoteric surfactants, zwitterionic surfactants, nonionic surfactants, or combinations thereof.

Another aspect may include any of the previous aspects, further comprising functionalizing the nanomaterials with at least one of magnetic or electric properties prior to adding the nanomaterial particles to the cement slurry.

Another aspect may include any of the previous aspects, in which the nanomaterials comprise at least one of nanotubes, nanofibers, or nanosheets.

Another aspect may include any of the previous aspects, in which the nanomaterials comprise at least one of nanosilica, nanoalumina, nanozinc oxide, nanocarbon, carbon nanotubes, nanocalcium carbonate, boron nitride nanotubes, or nanozirconium oxide.

Another aspect may include any of the previous aspects, in which the carbon nanotubes comprise at least one of single-walled nanotubes, double-walled nanotubes, multi-walled carbon nanotubes, or narrow-walled nanotubes.

Another aspect may include any of the previous aspects, in which the nanomaterials conduct electric energy.

Another aspect may include any of the previous aspects, in which the cement additive particles comprise at least one of barite particles, hematite particles, hausmannite particles, bentonite particles, forsterite particles, diopside particles, montmorillonite particles, vermiculite particles, sand particles, or pumice particles.

Another aspect may include any of the previous aspects, in which the cement is hydraulic.

Another aspect may include any of the previous aspects, in which the cement is non-hydraulic.

Another aspect may include any of the previous aspects, in which the cement particles comprise at least one of Portland cement particles, siliceous fly ash particles, calcareous fly ash particles, slag cement particles, silica fume particles, calcium hydroxide particles, silicates particles, belite ($Ca_2SiO_5$) particles, alite ($Ca_3SiO_4$) particles, tricalcium aluminate ($Ca_3Al_2O_6$) particles, tetracalcium aluminoferrite ($Ca_4Al_2Fe_2O_{10}$) particles, brownmillerriate ($4CaO.Al_2O_3.Fe_2O_3$) particles, gypsum ($CaSO_4.2H_2O$) particles, sodium oxide particles, potassium oxide particles, limestone particles, lime (calcium oxide) particles, hexavalent chromium particles, calcium aluminate particles, and combinations thereof.

Another aspect may include any of the previous aspects, in which the cured cement conducts electric current.

Another aspect may include any of the previous aspects, in which the cured cement is magnetic.

Another aspect may include any of the previous aspects, in which cured cement has an elastic modulus of from 0.1 to 10 Mpsi.

The description of the embodiments is illustrative in nature and is in no way intended to be limiting it its application or use. As used throughout this disclosure, the singular forms "a," "an" and "the" include plural references unless the context clearly dictates otherwise. Thus, for example, reference to "a" component includes aspects having two or more such components, unless the context clearly indicates otherwise.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

What is claimed is:

1. A method of making a cured cement comprising:
    synthesizing nanomaterials via chemical vapor deposition on at least one of cement particles or cement additive particles to form nanomaterial particles,
    functionalizing the nanomaterials with at least one of magnetic or electric properties prior to adding the nanomaterial particles to a cement slurry,
    adding the nanomaterial particles to the cement slurry to form a modified cement slurry, and
    curing the modified cement slurry to form a cured cement, in which the nanomaterials are interconnected and form a conductive web within the cured cement.

2. The method of claim 1, further comprising adding at least one of a dispersing agent or a surfactant to the cement slurry prior to adding the nanomaterial particles to the cement slurry.

3. The method of claim 2, in which the dispersing agent comprises polycarboxylate ether.

4. The method of claim 2, in which the surfactant comprises at least one of anionic surfactants, cationic surfactants, amphoteric surfactants, zwitterionic surfactants, non-ionic surfactants, or combinations thereof.

5. The method of claim 1, in which the nanomaterials comprise at least one of nanotubes, nanofibers, or nanosheets.

6. The method of claim 1, in which the nanomaterials comprise at least one of nanosilica, nanoalumina, nanozinc oxide, nanocarbon, carbon nanotubes, nanocalcium carbonate, boron nitride nanotubes, or nanozirconium oxide.

7. The method of claim 6, in which the carbon nanotubes comprise at least one of single-walled nanotubes, double-walled nanotubes, multi-walled carbon nanotubes, or narrow-walled nanotubes.

8. The method of claim 1, in which the nanomaterials conduct electric energy.

9. The method of claim 1, in which the cement additive particles comprise at least one of barite particles, hematite particles, hausmannite particles, bentonite particles, forsterite particles, diopside particles, montmorillonite particles, vermiculite particles, sand particles, or pumice particles.

10. The method of claim 1, in which the cement slurry is hydraulic.

11. The method of claim 1, in which the cement slurry is non-hydraulic.

12. The method of claim 1, in which the cement particles comprise at least one of Portland cement particles, siliceous fly ash particles, calcareous fly ash particles, slag cement particles, silica fume particles, calcium hydroxide particles, silicates particles, belite ($Ca_2SiO_5$) particles, alite ($Ca_3SiO_4$) particles, tricalcium aluminate ($Ca_3Al_2O_6$) particles, tetracalcium aluminoferrite ($Ca_4Al_2Fe_2O_{10}$) particles, brownmillerriate ($4CaO.Al_2O_3.Fe_2O_3$) particles, gypsum ($CaSO_4.2H_2O$) particles, sodium oxide particles, potassium oxide particles, limestone particles, lime (calcium oxide) particles, hexavalent chromium particles, calcium aluminate particles, and combinations thereof.

13. The method of claim 1, in which the cured cement conducts electric current.

14. The method of claim 1, in which the cured cement is magnetic.

15. The method of claim 1, in which the cured cement has an elastic modulus of from 0.1 to 10 Mpsi.

16. The method of claim 1, wherein functionalizing the nanomaterials comprises functionalizing the nanomaterials with electrically conductive elements.

17. The method of claim 16, wherein the electrically conductive elements comprises carbon, nickel, copper, gold, silver, titanium, or combinations thereof.

* * * * *